May 2, 1933.  A. L. PARKER  1,906,999
CULINARY UTENSIL
Filed Feb. 7, 1931
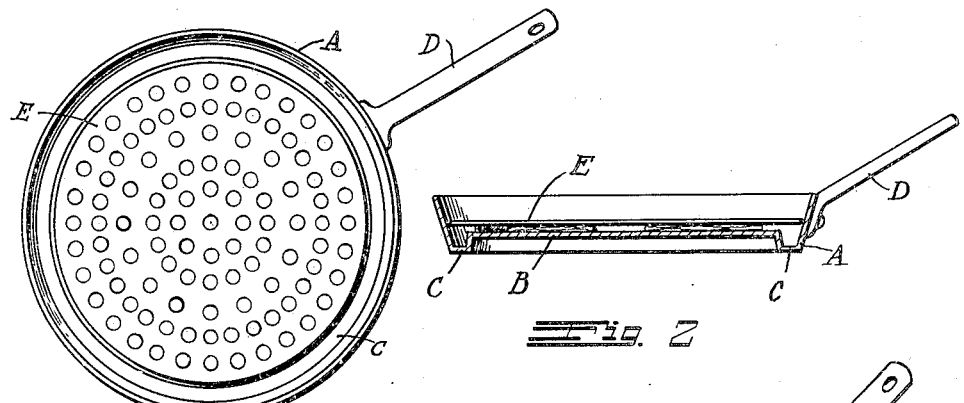
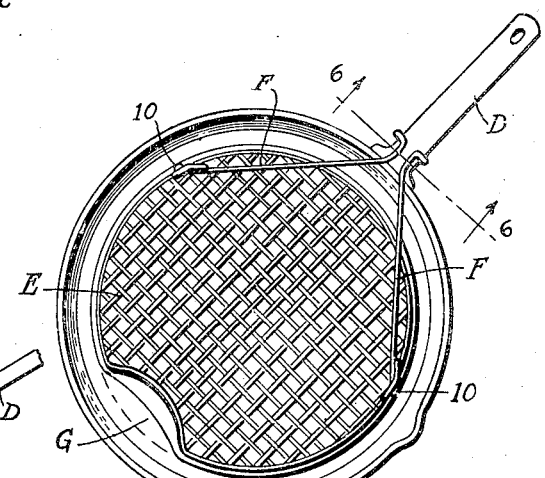
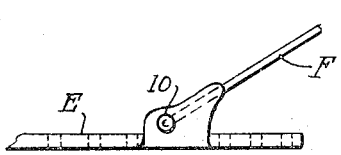
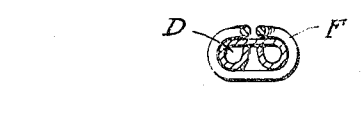
Inventor:
Alonzo L. Parker;

Patented May 2, 1933

1,906,999

UNITED STATES PATENT OFFICE

ALONZO L. PARKER, OF LOS ANGELES, CALIFORNIA

CULINARY UTENSIL

Application filed February 7, 1931. Serial No. 514,126.

This device belongs to the general class of culinary appliances.

The objects of the invention are to provide a vessel wherein meats and similar food substances which are comparatively thin and which generally contain considerable grease, such as bacon, ham or the like, may be cooked without the released greases or juices remaining on or around the food substance; which is adapted to hold and maintain such thin foodstuffs in the process of cooking in a flat condition and prevent curling thereof; which, by separation of the juices from meats and the like, enables these latter to be converted or used in any manner, as for making gravy; and which vessel can be cheaply made so that it may be widely distributed. Other objects will be disclosed as this description proceeds.

With the foregoing and other objects in view, the invention consists in the novel and useful formation, construction, interrelation and combination of parts, members and features, as well as mode and methods of use thereof, and steps and performances taken and had, all as hereinafter described, shown in the drawing and finally pointed out in claims.

In the drawing:

Fig. 1 is a plan of a pan with presser plate, made in accordance with this invention.

Fig. 2 is a vertical section therethrough.

Fig. 3 is a vertical section of a modification of same, showing a spoon depression in the pan bottom and a wire mesh presser plate held in position by link members which extend diagonally to the handle of the pan adjacent the wall of the vessel and are there bent around the handle.

Fig. 4 is a plan view of same.

Fig. 5 is a detail of a connecting ear or member to which a link is connected, to an enlarged scale, and shows a fragmentary portion of the presser plate and a link.

Fig. 6 is a detail to an enlarged scale of the wire link where bent around the handle of the pan at the mid-point of the links which extend to the presser plate, the figure being a section on line 6—6 of Fig. 4.

Referring to the drawing, "A" represents the vessel itself; "B" the main portion of the bottom; and "C" another portion of the bottom which, in general, surrounds the main bottom portion "B", and which is depressed below the level of the bottom portion "B". "D" is a handle of any convenient form, and "E" is a flat pressing member of any suitable foraminous material.

As shown in Fig. 1, presser plate "E" has such dimension as conforms to the shape of the pan "A", so that it is held in position by the sides of the pan. Figs. 3 and 4 show modifications in which the pressing element "E" is made of a wire mesh and is held in position by two diagonal members, "F", which are formed of a single wire bent around the handle "D", the ends whereof extend to eyelets "10" on the presser plate "E", through which the ends pass and are bent rearwardly to form a hinged joint, as is also depicted in Figs. 5 and 6. By this construction it is obvious that the presser plate may be lifted up and the portion "6", bent around the handle, may be slipped from handle "D" so that the parts may be easily separated for cleaning.

This presser plate is especially adapted for use with that form of frying pan in which the pan bottom "C" is at a lower elevation than the main portion "B", and which is sometimes made with an inwardly extended depression, as "G" shown in Figs. 3 and 4, which provides a sufficient width between the outer element of the vessel and the inner portion of the depression to admit a conveniently sized spoon.

In the operation of this device, strips or slices of foodstuffs, such as bacon or ham, are laid on the upper level bottom, "B", and the presser plate "E" is laid upon them. The pan is then heated in any convenient manner, either by a flame or electric element underneath, or by placing the entirety inside an oven. If the pan has an elevated central bottom portion, the greases are slightly squeezed out by the weight of the presser plate "E" and run to the bottom portion "C" of the pan, the level whereof is below that of "B". In this way the greases pass away from the food as fast as they are rendered from it, so that the cooking proceeds without grease surrounding the meat or the latter lying therein. The presser plate "E" maintains the slices flat, and it has been found in practice that thin slices of ham or bacon cooked in this manner and by the use of this invention may be thoroughly cooked without becoming brittle or burned, uniformly cooked throughout, practically free of grease, and substantially flat and uncurled.

Having described my invention in connection with illustrative embodiments, forms and arrangements of parts, it will be understood that many variants thereof are possible to those skilled in the art, and my invention, in its broader aspects, is not limited to the particular construction or application herein shown and described, as changes in size, proportions, configurations, arrangements, assemblage, interaction, juxtaposition and mechanical relations, as well as additions, omissions, substitutions, combinations and alterations of forms, parts, members, features and in the kind and order of operations and successive steps, may be made without departing from the broad spirit of this invention.

I claim as my invention:

1. An auxiliary member for handled cooking vessels, comprising a relatively thin planar element adapted to be placed inside a vessel and parallel to the bottom surface thereof; a support therefor comprising a bar member having its ends spaced apart and hingedly attached to said element adjacent its periphery, the portions of said bar extending each from its hinged connection toward the vessel handle, said bar being formed at its middle into a runner adapted to slide longitudinally off the handle.

2. In a cooking utensil, the combination of a circular flat bottom vessel, a handle extending from the periphery thereof, a circular presser plate of less diameter than said vessel bottom and adapted to cooperate therewith, a support for said plate comprising a bar member, both ends whereof are hinged to said plate at the ends of a chord across a segment thereof, the middle portion of said bar member being formed into a clasp-like member adapted to partially encircle and to slide along the said handle.

3. An attachment for handled cooking vessels, including a flat circular plate adapted to press food against the bottom of a vessel, detachable supporting means for said plate comprising a member adapted to engage with the vessel handle and to slide longitudinally thereon formed with a bar transverse of one side of the handle and bent around to pass partly across the opposite side of the handle, said bar being then bent to continue each end thereof diagonally inward from the handle portion to two spaced points adjacent the periphery of said plate, hinged connecting means between said bar ends and the plate, the said diagonal portions having each a length sufficient to enable said plate to be moved from the bottom of the vessel to a position substantially perpendicular thereto.

4. In combination, a plate member adapted to be placed over the bottoms of handled cooking vessels, and a detachable support therefor, said support comprising a bar the mid portion whereof is bent to encircle the vessel handle, except a part of the top portion thereof, the ends of the bar being bent to extend diagonally inward and outward from each other, each extending from the handle-encircling portion to the plate member, a hinged connection between each bar end and the plate member adjacent the periphery of the plate, the entirety being adapted for moving said plate about its hinged joints to various angular positions of its plane with that of the vessel bottom, and to slide the support along and off of the vessel handle.

In testimony whereof, I have signed my name to this specification at Los Angeles, Calif., this 2nd day of February, 1931.

ALONZO L. PARKER.